US012477985B2

(12) United States Patent
Fredricks et al.

(10) Patent No.: US 12,477,985 B2
(45) Date of Patent: Nov. 25, 2025

(54) ACTIVE DECK PLATE OPENING

(71) Applicant: CNH Industrial America LLC, New Holland, PA (US)

(72) Inventors: Eric Fredricks, Daveport, IA (US); Matthew D'Amicantonio, Jonestown, PA (US); Bryan B. Finley, Bettendorf, IA (US); Eric L. Walker, Narvon, PA (US); Lane Darrow, Marietta, PA (US)

(73) Assignee: CNH Industrial America LLC, New Holland, PA (US)

( * ) Notice: Subject to any disclaimer, the term of this patent is extended or adjusted under 35 U.S.C. 154(b) by 706 days.

(21) Appl. No.: 17/887,198

(22) Filed: Aug. 12, 2022

(65) Prior Publication Data

US 2024/0049638 A1 Feb. 15, 2024

(51) Int. Cl.
*A01D 45/02* (2006.01)
*A01D 41/14* (2006.01)
(Continued)

(52) U.S. Cl.
CPC ......... *A01D 45/021* (2013.01); *A01D 41/141* (2013.01); *G01B 5/08* (2013.01);
(Continued)

(58) Field of Classification Search
CPC .. A01D 45/021; A01D 41/141; A01D 45/023; A01D 45/025; A01D 75/00;
(Continued)

(56) References Cited

U.S. PATENT DOCUMENTS 4,883,964 A * 11/1989 Bohman ............... A01D 75/00
250/341.7
4,918,441 A * 4/1990 Bohman ............ A01D 41/1278
340/901

(Continued)

FOREIGN PATENT DOCUMENTS

DE 102013110498 A1 * 3/2015 ........... A01D 45/021

OTHER PUBLICATIONS

International Search Report and Written Opinion for Application No. PCT/US2023/030044 dated Nov. 30, 2023 (14 pages).

*Primary Examiner* — Arpad Fabian-Kovacs
(74) *Attorney, Agent, or Firm* — CM Law PLLC; Stephen J. Weed (57) ABSTRACT

An agricultural harvester includes: a harvester frame; an agricultural header coupled with the harvester frame, the agricultural header including a plurality of deck plates; and a control system operatively coupled with the harvester frame and the agricultural header, the control system including: at least one sensor coupled with the agricultural header and configured for: detecting a crop material condition associated with a harvesting operation, the crop material condition being a crop material diameter; outputting a crop material condition signal corresponding to the crop material condition; a controller operatively coupled with the at least one sensor and configured for: receiving the crop material condition signal; determining an operative parameter of the plurality of deck plates based at least in part on the crop material condition signal and at least one offset condition signal.

15 Claims, 4 Drawing Sheets

(51) Int. Cl.
  *G01B 5/08* (2006.01)
  *G01B 21/10* (2006.01)
  *A01D 75/00* (2006.01)
  *G01B 3/38* (2006.01)
  *G01B 5/00* (2006.01)

(52) U.S. Cl.
  CPC ............ *G01B 21/10* (2013.01); *A01D 45/023* (2013.01); *A01D 45/025* (2013.01); *A01D 75/00* (2013.01); *G01B 3/38* (2013.01); *G01B 5/0035* (2013.01)

(58) Field of Classification Search
  CPC .......... G01B 3/38; G01B 5/0035; G01B 5/08; G01B 21/10
  See application file for complete search history.

(56) References Cited

U.S. PATENT DOCUMENTS

| | | | |
|---|---|---|---|
| 5,878,561 A * | 3/1999 | Gunn | A01D 45/023 56/119 |
| 8,220,235 B2 * | 7/2012 | Kowalchuk | A01D 45/021 56/62 |
| 8,224,534 B2 | 7/2012 | Kowalchuk | |
| 9,320,196 B2 | 4/2016 | Dybro et al. | |
| 9,322,629 B2 * | 4/2016 | Sauder | A01D 43/00 |
| 9,867,334 B2 | 1/2018 | Jongmans et al. | |
| 9,867,335 B1 * | 1/2018 | Obbink | A01D 45/021 |
| 9,936,637 B2 * | 4/2018 | Anderson | A01D 41/1271 |
| 10,034,424 B2 * | 7/2018 | Anderson | A01D 45/025 |
| 10,264,727 B2 | 4/2019 | Gessel et al. | |
| 10,820,508 B2 * | 11/2020 | Dix | G05D 1/0278 |
| 2014/0230391 A1 * | 8/2014 | Hendrickson | G01N 33/0098 702/2 |
| 2014/0230580 A1 * | 8/2014 | Dybro | A01D 41/127 56/103 |
| 2015/0082760 A1 | 3/2015 | Zentner | |
| 2015/0319929 A1 * | 11/2015 | Hendrickson | A01D 75/00 33/504 |
| 2015/0327440 A1 * | 11/2015 | Dybro | A01D 75/00 73/862.541 |
| 2021/0318118 A1 | 10/2021 | Eichhorn | |
| 2021/0329838 A1 | 10/2021 | Zielke | |
| 2022/0000024 A1 | 1/2022 | Zielke | |
| 2022/0225569 A1 * | 7/2022 | Zielke | A01D 45/021 |
| 2024/0130279 A1 * | 4/2024 | Bomleny | A01D 41/127 |
| 2024/0215483 A1 * | 7/2024 | Advani | A01D 41/141 |

\* cited by examiner

ACTIVE DECK PLATE OPENING

FIELD OF THE INVENTION

The present invention pertains to an agricultural harvester, and, more specifically, to a combine header.

BACKGROUND OF THE INVENTION

An agricultural harvester known as a "combine" is historically termed such because it combines multiple harvesting functions with a single harvesting unit, such as picking, threshing, separating, and cleaning. A combine includes a header (which can also be referred to as a head) which removes the crop from a field, and a feeder housing which transports the crop matter into a threshing rotor. The threshing rotor rotates within a perforated housing, which may be in the form of adjustable concaves, and performs a threshing operation on the crop to remove the grain. Once the grain is threshed it falls through perforations in the concaves onto a grain pan. From the grain pan the grain is cleaned using a cleaning system, and is then transported to a grain tank onboard the combine. A cleaning fan blows air through the sieves to discharge chaff and other debris toward the rear of the combine. Non-grain crop material such as straw from the threshing section proceeds through a residue handling system, which may utilize a straw chopper to process the non-grain material and direct it out the rear of the combine. When the grain tank becomes full, the combine is positioned adjacent a vehicle into which the grain is to be unloaded, such as a semi-trailer, gravity box, straight truck, or the like, and an unloading system on the combine is actuated to transfer the grain into the vehicle.

More particularly, a rotary threshing or separating system includes one or more rotors that can extend axially (front to rear) or transversely (side to side) within the body of the combine, and which are partially or fully surrounded by perforated concaves. The crop material is threshed and separated by the rotation of the rotor within the concaves. Coarser non-grain crop material such as stalks and leaves pass through a straw beater to remove any remaining grains, and then are transported to the rear of the combine and discharged back to the field. The separated grain, together with some finer non-grain crop material such as chaff, dust, straw, and other crop residue are discharged through the concaves and fall onto a grain pan where they are transported to a cleaning system. Alternatively, the grain and finer non-grain crop material may also fall directly onto the cleaning system itself.

A cleaning system further separates the grain from non-grain crop material, and typically includes a fan directing an airflow stream upwardly and rearwardly through vertically arranged sieves which oscillate in a fore and aft manner. The airflow stream lifts and carries the lighter non-grain crop material towards the rear end of the combine for discharge to the field. Clean grain, being heavier, and larger pieces of non-grain crop material, which are not carried away by the airflow stream, fall onto a surface of an upper sieve (also known as a chaffer sieve), where some or all of the clean grain passes through to a lower sieve (also known as a cleaning sieve). Grain and non-grain crop material remaining on the upper and lower sieves are physically separated by the reciprocating action of the sieves as the material moves rearwardly. Any grain and/or non-grain crop material which passes through the upper sieve, but does not pass through the lower sieve, is directed to a tailings pan. Grain falling through the lower sieve lands on a bottom pan of the cleaning system, where it is conveyed forwardly toward a clean grain auger. The clean grain auger conveys the grain to a grain elevator, which transports the grain upwards to a grain tank for temporary storage. The grain accumulates to the point where the grain tank is full and is discharged to an adjacent vehicle such as a semi trailer, gravity box, straight truck or the like by an unloading system on the combine that is actuated to transfer grain into the vehicle.

Headers of combines can be used to harvest various types of crop material, such as corn. Such headers can include a plurality of row units each of which receives a respective corn stalk. A respective row unit can include two gathering chains each including paddles, two deck plates (which can also be referred to as stripper plates) which are spaced apart from one another to form a gap therebetween, and two rotating stalk rolls. The gap between the deck plates receives the corn stalk, and as the corn stalk is pulled down between the deck plates by the stalk rolls ears attached to the stalk can strike the deck plates and thereby be stripped from the stalk and be moved onward toward the interior of the combine by the paddles of the gathering chains. A problem exists, however, with such headers, namely, losing grain and taking in too much non-grain material.

What is needed in the art is a way to control grain loss and intake of non-grain material.

SUMMARY OF THE INVENTION

The present invention provides a control system for controlling grain loss and intake of non-grain material by way of various factors.

The invention in one form is directed to a control system of an agricultural harvester, the agricultural harvester including a harvester frame and an agricultural header coupled with the harvester frame, the agricultural header including a plurality of deck plate, the control system being operatively coupled with the harvester frame and the agricultural header, the control system including: at least one sensor coupled with the agricultural header and configured for: detecting a crop material condition associated with a harvesting operation, the crop material condition being a crop material diameter; outputting a crop material condition signal corresponding to the crop material condition; and a controller operatively coupled with the at least one sensor and configured for: receiving the crop material condition signal; determining an operative parameter of the plurality of deck plates based at least in part on the crop material condition signal and at least one offset condition signal.

The invention in another form is directed to an agricultural harvester, including: a harvester frame; an agricultural header coupled with the harvester frame, the agricultural header including a plurality of deck plates; and a control system operatively coupled with the harvester frame and the agricultural header, the control system including: at least one sensor coupled with the agricultural header and configured for: detecting a crop material condition associated with a harvesting operation, the crop material condition being a crop material diameter; outputting a crop material condition signal corresponding to the crop material condition; a controller operatively coupled with the at least one sensor and configured for: receiving the crop material condition signal; determining an operative parameter of the plurality of deck plates based at least in part on the crop material condition signal and at least one offset condition signal.

The invention in yet another form is directed to a method of using an agricultural harvester, the method including the steps of: providing the agricultural harvester including a harvester frame, an agricultural header coupled with the harvester frame, and a control system, the agricultural header including a plurality of deck plates, the control system being operatively coupled with the harvester frame and the agricultural header and including at least one sensor coupled with the agricultural header and a controller operatively coupled with the at least one sensor; detecting, by the at least one sensor, a crop material condition associated with a harvesting operation, the crop material condition being a crop material diameter; outputting, by the at least one sensor, a crop material condition signal corresponding to the crop material condition; receiving, by the controller, the crop material condition signal; and determining, by the controller, an operative parameter of the plurality of deck plates based at least in part on the crop material condition signal and at least one offset condition signal.

An advantage of the present invention is that it provides a way for adjusting the gap between the deck plates based on an average stalk diameter. That is, provided is closed loop control of the deck plate opening based on, for example, a running average of stalk diameter entering the corn header.

Another advantage of the present invention is that it provides a way for adjusting the gap between the deck plates based on crop variety, crop verticality, and/or desirability of non-grain material.

BRIEF DESCRIPTION OF THE DRAWINGS

For the purpose of illustration, there are shown in the drawings certain embodiments of the present invention. It should be understood, however, that the invention is not limited to the precise arrangements, dimensions, and instruments shown. Like numerals indicate like elements throughout the drawings. In the drawings.

DETAILED DESCRIPTION OF THE INVENTION

The terms "grain", "straw" and "tailings" are used principally throughout this specification for convenience but it is to be understood that these terms are not intended to be limiting. Thus "grain" refers to that part of the crop material which is threshed and separated from the discardable part of the crop material, which is referred to as non-grain crop material, MOG (Material Other than Grain), or straw. Incompletely threshed crop material is referred to as "tailings". Also, the terms "forward", "rearward", "left" and "right", when used in connection with the agricultural harvester and/or components thereof are usually determined with reference to the direction of forward operative travel of the harvester, but again, they should not be construed as limiting. The terms "longitudinal" and "transverse" are determined with reference to the fore-and-aft direction of the agricultural harvester and are equally not to be construed as limiting. The terms "downstream" and "upstream" are determined with reference to the intended direction of crop material flow during operation, with "downstream" being analogous to "rearward" and "upstream" being analogous to "forward."

Figure 1:
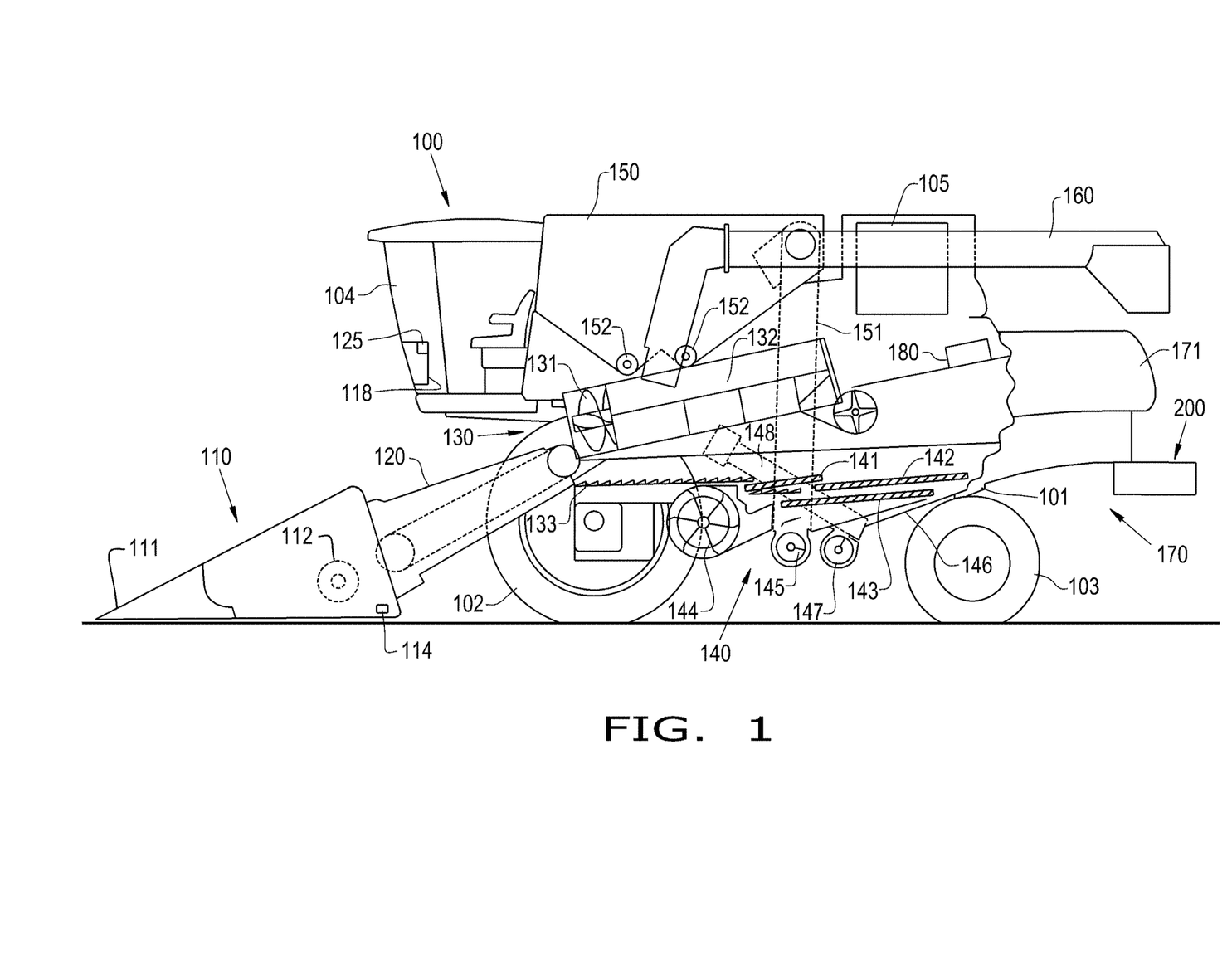
FIG. 1 illustrates a side view of an exemplary embodiment of an agricultural harvester, the agricultural harvester including a header assembly and a control system, in accordance with an exemplary embodiment of the present invention.

Referring now to the drawings, and more particularly to FIG. 1, there is shown an embodiment of an agricultural harvester 100 in the form of a combine which generally includes a chassis 101 (which can be referred to as a harvester frame 101), ground engaging wheels 102 and 103, header 110, feeder housing 120, operator cab 104, threshing and separating system 130, cleaning system 140, grain tank 150, and unloading conveyance 160. Front wheels 102 are larger flotation type wheels, and rear wheels 103 are smaller steerable wheels. Motive force is selectively applied to front wheels 102 through a power plant in the form of a diesel engine 105 and a transmission (not shown). Although combine 100 is shown as including wheels, is also to be understood that combine 100 may include tracks, such as full tracks or half tracks. Further, combine 100 includes a control system 118, in whole or in part, operatively coupled with harvester frame 101 and header frame 114 (shown schematically). Control system 118 can further include an input/output device 125 such as a laptop computer (with keyboard and display) or a touchpad (including keypad functionality and a display), device 125 being configured for a user to interface therewith. Device 125 can be located in any suitable location, such as mounted in cab 104 (as indicated in FIG. 1), or remotely from combine 100.

Header 110 (which can be referred to as a header assembly or an agricultural header) is mounted to the front of combine 100 and, in this example, is a corn header 110 (which can also be referred to as a corn head or a corn assembly). Header 110 is coupled with harvester frame 101. Header 110 includes a header frame 114 (shown schematically in FIG. 1), a plurality of dividers 111 (which can be referred to as snouts 111) coupled with header frame 114 and spaced apart across the front of header 110 (the left-most divider 111 being shown in FIG. 1), and a plurality of row units 206 (FIG. 2) coupled with the header frame 114, each row unit 206 being generally operatively positioned between two respective dividers 111. Row units 206 separate the ear of corn from respective stalks in a field during forward motion of combine 100 and move the ears to an auger 112, such as a double auger 112, which feeds the severed crop (here, an ear of corn) laterally inwardly from each side toward feeder housing 120 (it can be appreciated that other types of conveyors can be used besides double auger 112, such as a draper header). Feeder housing 120 conveys the severed crop to threshing and separating system 130, and is selectively vertically movable using appropriate actuators, such as hydraulic cylinders (not shown). The header of the present invention can be flexible, rigid, and/or articulating.

Threshing and separating system 130 is of the axial-flow type, and generally includes a threshing rotor 131 at least partially enclosed by a rotor cage and rotatable within a corresponding perforated concave 132. The cut crops are threshed and separated by the rotation of rotor 131 within concave 132, and larger elements, such as stalks, leaves and the like are discharged from the rear of combine 100. Smaller elements of crop material including grain and non-grain crop material, including particles lighter than grain, such as chaff, dust and straw, are discharged through perforations of concave 132. Threshing and separating system 130 can also be a different type of system, such as a system with a transverse rotor rather than an axial rotor, etc.

Grain which has been separated by the threshing and separating assembly 130 falls onto a grain pan 133 and is conveyed toward cleaning system 140. Cleaning system 140 may include an optional pre-cleaning sieve 141, an upper sieve 142 (also known as a chaffer sieve or sieve assembly), a lower sieve 143 (also known as a cleaning sieve), and a cleaning fan 144. Grain on sieves 141, 142 and 143 is subjected to a cleaning action by fan 144 which provides an air flow through the sieves to remove chaff and other impurities such as dust from the grain by making this material airborne for discharge from a straw hood 171 of a residue management system 170 of combine 100. Optionally, the chaff and/or straw can proceed through a chopper 180 to be further processed into even smaller particles before discharge out of the combine 100 by a spreader assembly 200. It should be appreciated that the "chopper" 180 referenced herein, which may include knives, may also be what is typically referred to as a "beater", which may include flails, or other construction and that the term "chopper" as used herein refers to any construction which can reduce the particle size of entering crop material by various actions including chopping, flailing, etc. Grain pan 133 and pre-cleaning sieve 141 oscillate in a fore-to-aft manner to transport the grain and finer non-grain crop material to the upper surface of upper sieve 142. Upper sieve 142 and lower sieve 143 are vertically arranged relative to each other, and likewise oscillate in a fore-to-aft manner to spread the grain across sieves 142, 143, while permitting the passage of cleaned grain by gravity through the openings of sieves 142, 143.

Clean grain falls to a clean grain auger 145 positioned crosswise below and toward the front of lower sieve 143. Clean grain auger 145 receives clean grain from each sieve 142, 143 and from a bottom pan 146 of cleaning system 140. Clean grain auger 145 conveys the clean grain laterally to a generally vertically arranged grain elevator 151 for transport to grain tank 150. Tailings from cleaning system 140 fall to a tailings auger trough 147. The tailings are transported via tailings auger 147 and return auger 148 to the upstream end of cleaning system 140 for repeated cleaning action. A pair of grain tank augers 152 at the bottom of grain tank 150 convey the clean grain laterally within grain tank 150 to unloader 160 for discharge from combine 100.

Figure 2:
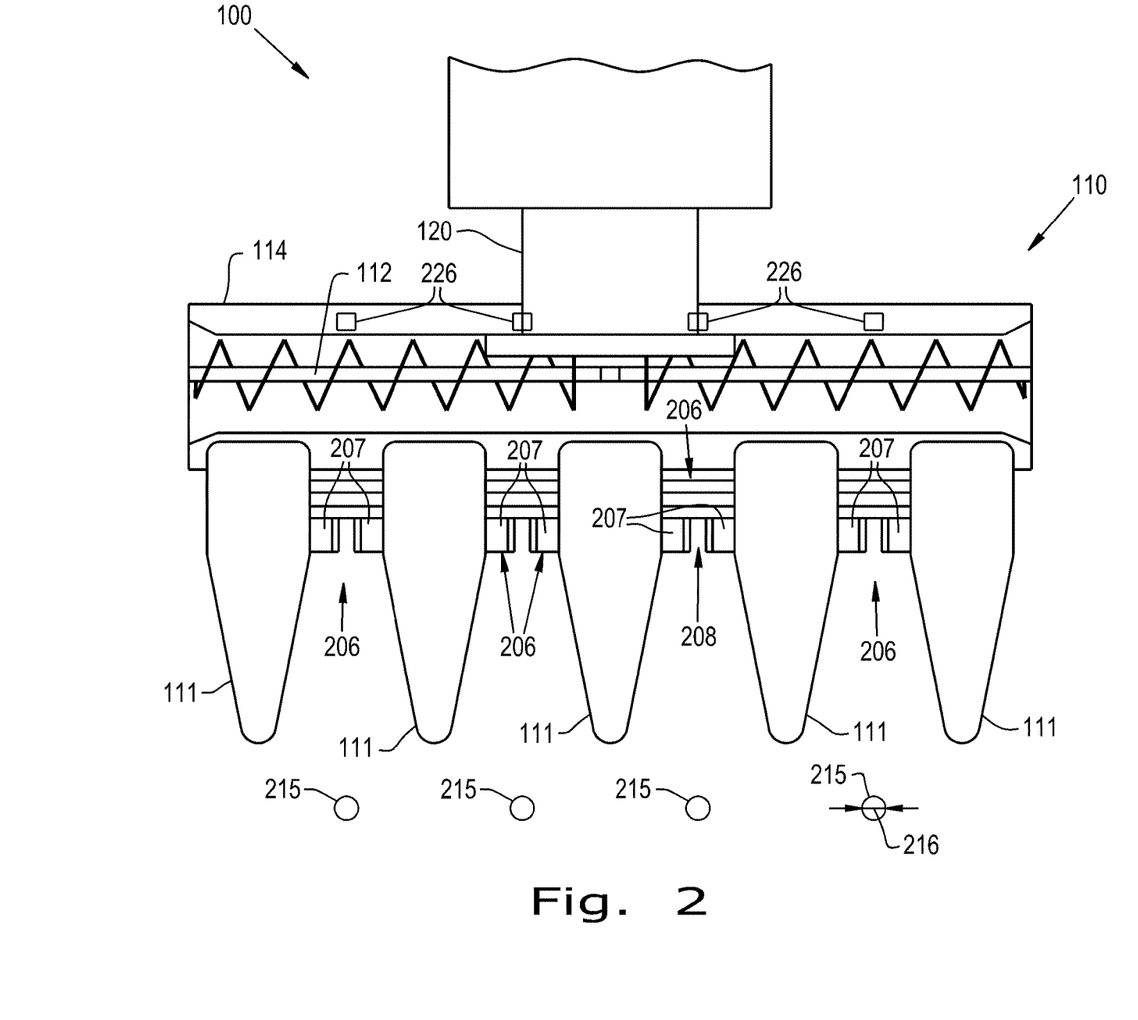
FIG. 2 illustrates a top view of the agricultural harvester of FIG. 1, with portions broken away, showing, more particularly, the header assembly and aspects of the control system, the header assembly including a plurality of row units, in accordance with an exemplary embodiment of the present invention.

Referring now to FIG. 2, there is shown schematically a top view of combine 100 with header 110, with portions broken away. Header 110 includes frame 114 and dividers 111 coupled therewith; it can be appreciated that header 110 can include any suitable number of dividers 111, such as more or less than what is shown in FIG. 2. Each row unit 206 includes two gathering chains each including paddles (not shown), two deck plates 207 (which can also be referred to as stripper plates 207) which are spaced apart from one another to form a gap 208 therebetween, and two rotating stalk rolls (not shown), as is known. Each row unit 206 receives crop material 215, which is formed as respective ones of the corn stalks 215. More specifically, gap 208 between deck plates 207 receives the corn stalk 215, and as the corn stalk 215 is pulled down between deck plates 207 by the stalk rolls ears attached to the stalk strike deck plates 207 and are thereby stripped from the stalk by deck plates 207 and are then moved onward toward the interior of combine 100 by the paddles of the gathering chains. Header 110, as well as control system 118, further includes a plurality of sensors 226, which are configured for detecting a diameter 216 of stalks 215 (the stalk diameter 216) of corn entering or about to enter a respective gap 208. Each row unit 206 can have at least one such sensor 226 assigned to it. Each sensor 226 can be coupled with header frame 114 and can be positioned in any suitable location in order to detect the stalk diameter 216, as described, such as atop a top wall of header frame 114 (sensor 226 is shown schematically placed in FIG. 2). Sensor 226 can be any suitable type of sensor configured for sensing such a dimension, for example, an optical or visual sensor, such as a camera, a lidar sensor, and/or a radar sensor (which can be deemed to be a kind of image or optical sensor herein).

Figure 3:
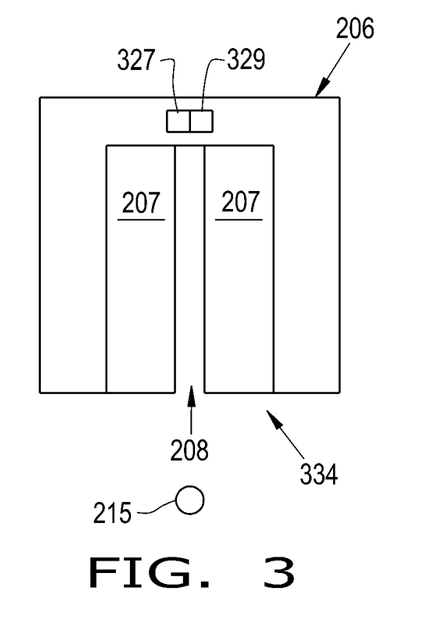
FIG. 3 illustrates a top view of the row unit of FIG. 2, with portions broken away, the row unit including deck plates in a first position, in accordance with an exemplary embodiment of the present invention.
Figure 4:
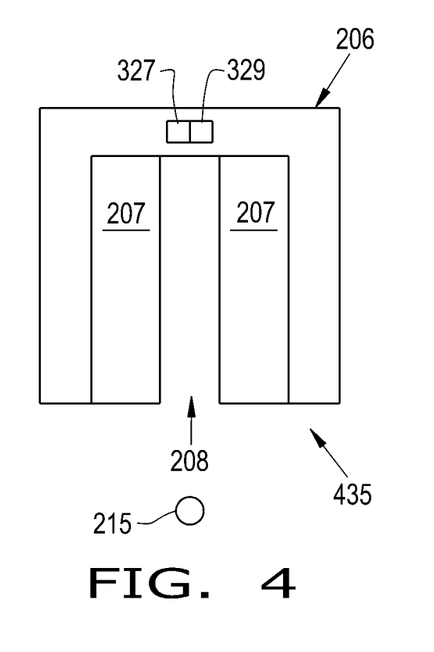
FIG. 4 illustrates a top view of the row unit of FIG. 3, the deck plates being a second position, in accordance with an exemplary embodiment of the present invention.

Referring now to FIGS. 3 and 4, there is shown schematically a top view of row unit 206, with portions broken away, together with a corn stalk 215, toward which row unit 206 is headed and preparing to receive in gap 208. Row unit 206 includes two deck plates 207. Deck plates 207 are configured for being selectively moved between a first position 334 (FIG. 3) and a second position 435 (FIG. 4), and for intermediate positions therebetween, so as widen or to narrow gap 208 selectively. Header 110, or, more specifically, row unit 206, can further include one or more sensor 327 and actuators 329, each of which is coupled with frame 114 of header 110. Sensor 327 is a position sensor and is configured for detecting a position of one or more deck plates 207 to which sensor 327 is assigned. FIGS. 3 and 4 show that row unit 206 includes a single sensor 327 is assigned to two deck plates 207, but it can be appreciated that a one sensor 327 can be assigned respectively to each deck plate 207. To detect the position of a respective deck plate 207, sensor 327 can do so directly (for example, sensing the position of deck plate 207 relative to a reference position) or indirectly (for example, sensing a position of actuator 329 or a movable portion of actuator 329, such as a rod or a piston of a hydraulic cylinder assembly which actuator 329 may form, such a movable portion corresponding to the position of deck plate 207). With regard to the latter (indirect sensing), sensor 327 may be positioned externally to actuator 329 or internally to actuator (such as within a cylinder of a hydraulic cylinder assembly). Actuator 329 is configured for adjusting the position of one or more deck plates 207 to which actuator 329 is assigned; for example, actuator 329 may be assigned to a single deck plate 207 or to the two deck plates 207 of a single row unit 206. Actuator 329 can be any suitable actuator configured to move deck plate(s) 207 between first and second positions 334, 435 (or to intermediate positions therebetween). By way of example and not limitation, actuator 329 can be a fluid actuator (such as a hydraulic actuator or a pneumatic actuator), an electric actuator (such as an electromechanical actuator or an electrohydraulic actuator), an electronic actuator, and/or a mechanical actuator. Herein, actuator 329 is assumed to be formed as a fluid actuator, more specifically, as a hydraulic cylinder assembly, according to an exemplary embodiment of the present invention.

Figure 5:
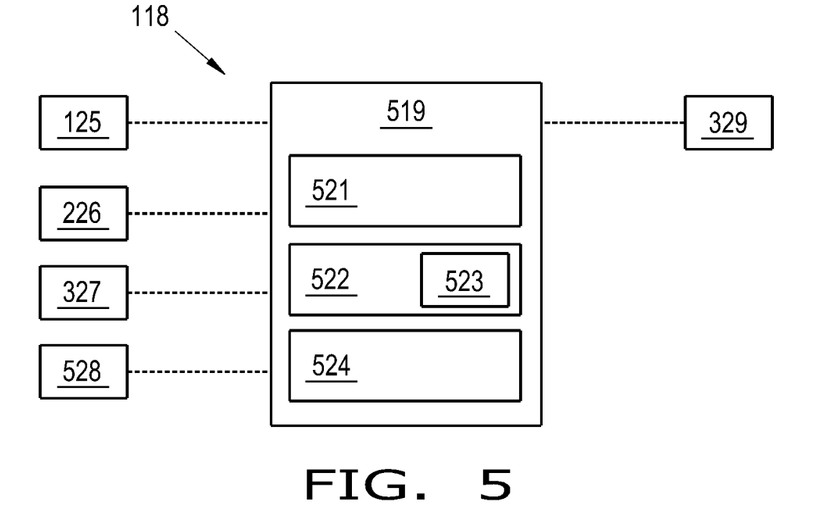
FIG. 5 illustrates the control system of FIG. 1, in accordance with an exemplary embodiment of the present invention.

Referring now to FIG. 5, there is shown a schematic view of control system 118. Control system 118 includes controller 519, input/output device 125, stalk diameter sensor 226, deck plate position sensor 327, sensor 528 (optional), and actuator 329, each of which is operatively coupled with one another. Regarding controller 519, controller 519 is operatively coupled with harvester frame 101.

In general, controller 519 may correspond to any suitable processor-based device(s), such as a computing device or any combination of computing devices. Controller 519 may generally include one or more processor(s) 521 and associated memory 522 configured to perform a variety of computer-implemented functions (e.g., performing the methods, steps, algorithms, calculations and the like disclosed herein). Thus, controller 519 may include a processor 521 therein, as well as associated memory 222, data 223, and instructions 224, each forming at least part of the controller 519. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory 522 may generally include memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD), and/or other suitable memory elements. Such memory 522 may generally be configured to store information accessible to the processor(s) 521, including data 523 that can be retrieved, manipulated, created, and/or stored by the processor(s) 221 and the instructions 524 that can be executed by the processor(s) 521. In some embodiments, data 523 may be stored in one or more databases.

Further, controller 519 can communicate with input/output device 125, stalk diameter sensor 226, deck plate position sensor 327, sensor 528, and actuator 329 in any suitable way, such as a wired connection or a wireless connection, such as radio signals (RF), light signals, cellular, WiFi, Bluetooth, Internet, via cloud-based devices such as servers, and/or the like. Further, while not shown, controller 519 can communicate with a remotely located data center (which can also be a part of control system 118), which controller 519 can communicate with by any suitable way, such as a wired connection or a wireless connection, such as radio signals (RF), light signals, cellular, WiFi, Bluetooth, Internet, via cloud-based devices such as servers, and/or the like. Such a data center can include its own controller (and thus processor(s), memory, data, and instructions, substantially similar to that described above with respect to controller 519) which can be configured to perform any of the functions associated with controller 519. Controller 519 and the data center can be a part of any network facilitating such communication therebetween, such as a local area network, a metropolitan area network, a wide area network, a neural network, whether wired or wireless.

Input/output device 125 is configured for a user, such as the operator of combine 100, to interface therewith. Device 125 outputs signals to controller 519, and receives signals from controller 519. Thus, for example, operator can input operative settings by way of device 125.

Stalk diameter sensor 226, as indicated above, is configured for: detecting a crop material condition associated with a harvesting operation, the crop material condition being a crop material diameter 216; and outputting, to controller 519, a crop material condition signal corresponding to the crop material (stalk) condition, for example, a stalk diameter signal corresponding to stalk diameter 216.

Deck plate position sensor 327, as indicated above, is configured for: detecting a position of one or more deck plates 207; and outputting, to controller 519, a deck plate position signal corresponding to the position of deck plate(s) 207.

Sensor(s) 528 can be generic for any number of different types of sensors configured for detecting any number of different types of conditions. For example, sensor 528 can be a vertical sensor and thus be configured for detecting a crop material verticality condition of crop material 215, that is, of corn stalks 215 still in the field. This crop material verticality condition corresponds to an angle that stalks 215 make with a vertical reference line, and/or with a horizontal reference line (which can correspond substantially with the ground). Thus, a perfectly vertical corn stalk 215 is 0° from the vertical reference line and thus 90° from the horizontal reference line. Down crop refers to stalks 215 that are substantially horizontal, due to, for example, weather such as wind or hail, or animals bedding down. Such a verticality sensor 528 can be coupled with harvester frame 101 or header frame 114 and can be any suitable type of sensor, such as a camera, a lidar sensor, or a radar sensor. Verticality sensor 528 is further configured for outputting, to controller 519, a crop material verticality condition signal corresponding to the crop material verticality condition. Alternatively or in addition thereto, sensor 528 can be a moisture sensor and thus be configured for detecting a moisture content condition of crop material 215, namely, of the stalks, the ears, and/or of the grain of the ears, and for outputting, to controller 519, a moisture condition signal corresponding to the moisture content condition of the crop material 215. Such a moisture sensor 528 can be any suitable sensor configured for sensing moisture and can be positioned in any suitable location for doing so.

Actuator 329 is configured for: receiving an adjustment signal from controller 519, and selectively moving, based at least in part on the adjustment signal, deck plates of respective row units 206 between first position 334 and second position 435, or positions therebetween.

Referring to controller 519 again, controller 519 is configured for: (1) receiving the stalk diameter signal from sensor 226; (2) receiving the deck plate position signal from sensors 327; (3) determining an operative parameter of deck pates 207 (that is, the position of deck plates 207 relative to one another, which corresponds to the spacing between deck plates 207) based at least in part on the stalk diameter signal; and (4) outputting the adjustment signal, based at least in part on the stalk diameter signal and the deck plate position signal, to actuator 329 configured for selectively moving, based at least in part on the adjustment signal, deck plates 207 between first position 334 and second position 435, or positions therebetween. Controller 519 is further configured for calculating an average diameter of the stalk diameters 216 of the plurality of stalks 215 that has been sensed by sensor 226 and making the adjustment of actuator 329 based on this average diameter. Further, deck plates 207 of each row unit 206 can be adjusted the same amount based on this average diameter, such that the spacing between deck plates 207 is uniform across heard 110. Alternatively, each row unit 206, or a groups of row units 206 less than the total number of row units, may receive their own average stalk diameter 216 and be adjusted based on that, thus providing even more specific and thus finer control. Further, the average stalk diameter 216 can be refreshed (which then can lead to a new adjustment of deck plates 207 via actuator 329) as often as the operator so desires, which can be input to controller 519 via device 125. For example, the frequency of such refreshing can occur in accordance with a selected time increment, a selected distance such as a selected number of acres, or the frequency can be running and thus continual, that is, the refreshing can occur whenever the calculated average changes, which would cause an adjustment to be made to deck plates 207.

In sum so far, the diameter 216 of corn stalks 215 varies throughout the field, and optimal deck plate opening (spacing therebetween, that is, gap 208) is important to control grain loss and MOG intake. Control system of combine 100 provides a way to monitor and actively control deck plate openings (gap 208), given that an operator typically is not fast enough to provide this level of control to deck plate spacing. As described, an average diameter of stalks 215 entering header 110 can be determined from multiple sensors 226 spread out along header 110. The readings from such sensors 226 can be used to calculate a running average that refreshes—as often as the operator so desires and inputs via device 125—as combine 100 passes through the field. This running average can then be used as an input to a closed loop control circuit that tries to match the deck plate opening to the diameter of the incoming crop material 215.

However, the positioning of deck plate 207 relative to one another (that is, the spacing between deck plates 207) can be based upon one or more additional factors as well, which can be referred to as offset conditions. The offset condition(s) causes the deck plate spacing to be further adjusted relative to the deck plate spacing corresponding to stalk diameter alone. This further adjustment can be, for example, an offset of any suitable amount, such as +/−5% or +/−10% of the adjustment that would be made based on stalk diameter alone. This offset amount can be input by the operator by way of device 125, inputting a specific percentage of offset as described. On the other hand, this offset amount can be calculated by controller 519 based upon one or more offset condition(s) that are input to controller 519. Such input(s) for this offset amount is received by controller 519 in the form of control signals, namely, at least one offset condition signal. Thus, controller 19 is configured for: receiving at least one offset condition signal corresponding to at least one offset condition; determining operative parameter of deck plates 207 (deck plate positioning and thus spacing relative to one another) based at least in part on the crop material condition signal (as described above) and the at least one offset condition signal; and outputting the adjustment signal, based at least in part on the operative parameter signal and the at least one offset condition signal, to actuator 329 configured for selectively moving, based at least in part on the adjustment signal, deck plates 207 between first position 334 and second position 435, or positions therebetween.

By way of example and not limitation, such offset conditions include or otherwise correspond to: the crop material verticality condition; a desired amount of non-grain crop material (MOG); and a crop material variety, and the moisture content condition. Each of these offset conditions can be input to controller 519 in the form of a corresponding offset condition signal. Regarding the crop material verticality condition, this condition is discussed above with respect to sensor 528. Thus, this offset condition can be sensed and outputted to controller by sensors) 528 functioning as crop verticality condition sensors. Alternatively or in addition thereto, the crop material verticality condition can be input by the operator into device 125, which sends this information as an offset condition signal to controller 519. That is, the operator of combine 100 can observe a down crop section of the field and input this into device 125, such as immediately upon encountering the down crop and immediately upon leaving the down crop, and/or by entering this information into device 125 well ahead of encountering the down crop in the field, such as by entering this information into an electronic map and/or using coordinates from a Global Positioning System (GPS). When controller 519 knows that combine 100 is to encounter down crop, controller can adjust deck plates 207 to be further spaced apart, for example, so that stalks 215 can come into gap 208 more easily. Regarding the desired amount of MOG, the operator can input into device 125 a desired amount of MOG to enter into the interior of combine 100. Depending upon conditions, the operator may wish more MOG to enter combine 100, to be processed therein, and to be spread back onto the field by combine 100. Thus, depending upon whether the operator wishes more or less MOG material to enter the interior of combine 100 and the operator's input of such information into device 125, deck plates 207 can be positioned closer to or farther apart from one another (for example, a desire for more MOG would cause gap 208 to be narrower). Regarding the crop material variety, the variety of crop material, such as the type of corn, can be input into device 125 by the operator, and this information can be outputted to and received by controller 519 (in this vein stalk 215 is generic to any variety of crop material, such as any variety of corn). Different varieties of corn, for instance, can make it desirable to run with deck plates closer to or wider from one another. For instance, one variety may provide that the crop material 215 is very dry and the ears of corn are very firmly attached to the stalk, which may make it desirable to have deck plates 207 closer together, to ensure the ears are properly detached from the stalk. On the other hand, another crop variety may provide that the ears of corn are loosely attached to the stalk, such that deck plates 207 can be run relatively farther apart. Even so, some crop varieties may be prone to more shatter loss by deck plates 207 (the ears shattering when they hit deck plates 207), such that running deck plates 207 closer together may be desirable, so that more MOG cushions (relatively speaking) the impact the ear makes with deck plates 207. Further, some varieties provide that the ears retain more or less husk, which can cushion the strike against deck plates 207, allowing deck plates 207 to be run father apart. Regarding the moisture condition, such moisture condition of crop material 215 can be input to controller 519 by a respective sensor 528 formed as a moisture sensor 528, as described above. Depending the moisture level, deck plates 207 can be further widened or narrowed. For example, when crop material 215 has a relatively higher moisture content, shatter loss may be less of a concern, such that deck plates 207 can be run closer together. Thus, the operator can run deck plates 207 tighter or looser depending on conditions, and/or controller 519 can automatically make such adjustments.

In use, as operator runs combine 100 through the field to harvest, for example, corn, control system 118 of combine 100 can adjust deck plates 207 to run an optimal spacing from one another. In order to obtain this optimal spacing, average stalk diameter 216 can be calculated. The spacing of deck plates 207 can be further adjusted based on offset conditions, which include but are not limited to the crop material verticality condition, the desired amount of MOG to enter the interior of combine 100, the crop material variety, and the moisture content condition of crop material 215.

Figure 6:
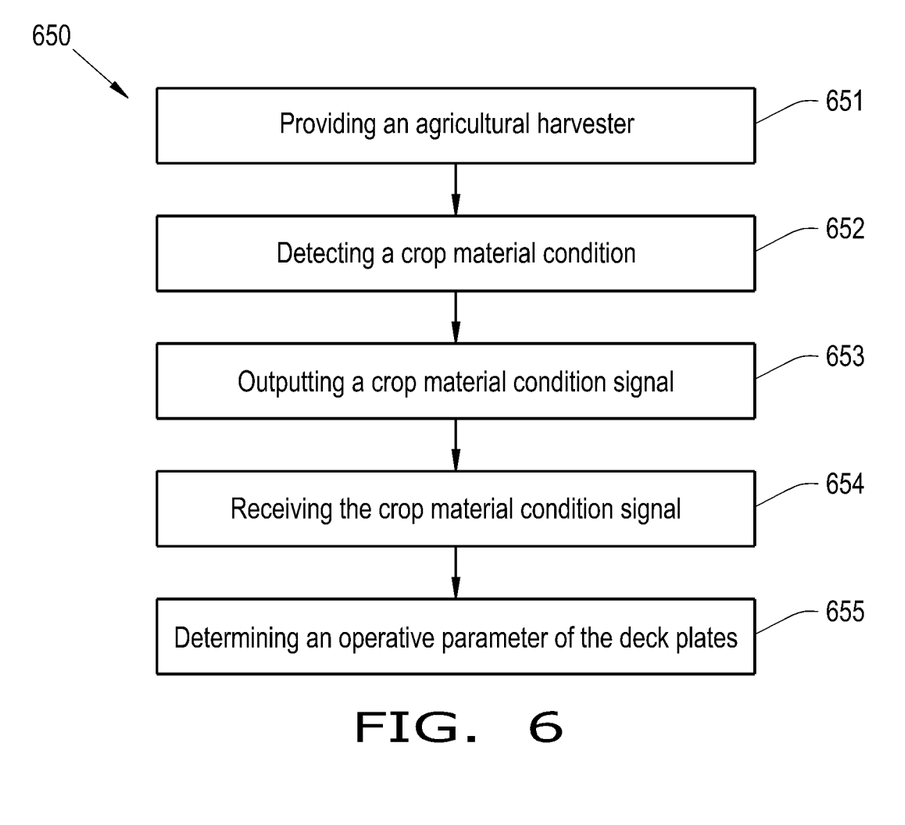
FIG. 6 illustrates a flow diagram showing a method of using an agricultural harvester, in accordance with an exemplary embodiment of the present invention.

Referring now to FIG. 6, there is shown a flow diagram of a method 650 of using an agricultural harvester 100, the method 650 including the steps of: providing 651 the agricultural harvester 100 including a harvester frame 114, an agricultural header 110 coupled with the harvester frame 114, and a control system 118, the agricultural header 110 including a plurality of deck plates 207, the control system 118 being operatively coupled with the harvester frame 114 and the agricultural header 110 and including at least one sensor 226 coupled with the agricultural header 110 and a controller 519 operatively coupled with the at least one sensor 226; detecting 652, by the at least one sensor 226, a crop material condition associated with a harvesting operation, the crop material condition being a crop material diameter 216; outputting 653, by the at least one sensor 226, a crop material condition signal corresponding to the crop material condition; receiving 654, by the controller 519, the crop material condition signal; and determining 655, by the controller 519, an operative parameter of the plurality of deck plates 207 based at least in part on the crop material condition signal and at least one offset condition signal. Further, the controller 519 is further configured for: outputting an adjustment signal, based at least in part on the operative parameter signal, to an actuator 329 configured for selectively moving, based at least in part on the adjustment signal, the plurality of deck plates 207 between a first position 334 and a second position 435. Further, the at least one offset condition signal can correspond to a crop material verticality condition. Further, the at least one offset condition signal can correspond to a desired amount of a non-grain crop material. Further, the at least one offset condition signal can correspond to a crop material variety.

It is to be understood that the steps of method 650 are performed by controller 519 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by controller 519 described herein, such as the method 650, is implemented in software code or instructions which are tangibly stored on a tangible computer readable medium. The controller 519 loads the software code or instructions via a direct interface with the computer readable medium or via a wired and/or wireless network. Upon loading and executing such software code or instructions by controller 519, controller 519 may perform any of the functionality of controller 519 described herein, including any steps of the method 650.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

What is claimed is:

1. A control system of an agricultural harvester, the agricultural harvester including a harvester frame and an agricultural header coupled with the harvester frame, the agricultural header including a plurality of deck plates, the control system being operatively coupled with the harvester frame and the agricultural header, the control system comprising:
    at least one sensor coupled with the agricultural header that:
        detects a crop material condition associated with a harvesting operation, the crop material condition being a crop material diameter;
        outputs a crop material condition signal corresponding to the crop material condition; and
    a controller operatively coupled with the at least one sensor that:
        receives the crop material condition signal;
        determines an operative parameter of the plurality of deck plates based at least in part on the crop material condition signal and at least one offset condition signal.

2. The control system of claim 1, wherein the controller further for:
    outputs an adjustment signal, based at least in part on the operative parameter signal, to an actuator that selectively moves, based at least in part on the adjustment signal, the plurality of deck plates between a first position and a second position.

3. The control system of claim 2, wherein the at least one offset condition signal corresponds to a crop material verticality condition.

4. The control system of claim 2, wherein the at least one offset condition signal corresponds to a desired amount of a non-grain crop material.

5. The control system of claim 2, wherein the at least one offset condition signal corresponds to a crop material variety.

6. An agricultural harvester, comprising:
    a harvester frame;
    an agricultural header coupled with the harvester frame, the agricultural header including a plurality of deck plates; and
    a control system operatively coupled with the harvester frame and the agricultural header, the control system including:
        at least one sensor coupled with the agricultural header that:
            detects a crop material condition associated with a harvesting operation, the crop material condition being a crop material diameter;
            outputs a crop material condition signal corresponding to the crop material condition;
        a controller operatively coupled with the at least one sensor that:
            receives the crop material condition signal;
            determines an operative parameter of the plurality of deck plates based at least in part on the crop material condition signal and at least one offset condition signal.

7. The agricultural harvester of claim 6, wherein the controller further:
    outputs an adjustment signal, based at least in part on the operative parameter signal, to an actuator that selectively moves, based at least in part on the adjustment signal, the plurality of deck plates between a first position and a second position.

8. The agricultural harvester of claim 7, wherein the at least one offset condition signal corresponds to a crop material verticality condition.

9. The agricultural harvester of claim 7, wherein the at least one offset condition signal corresponds to a desired amount of a non-grain crop material.

10. The agricultural harvester of claim 7, wherein the at least one offset condition signal corresponds to a crop material variety.

11. A method of using an agricultural harvester, the method comprising the steps of:
provi­ding the agricultural harvester including a harvester frame, an agricultural header coupled with the harvester frame, and a control system, the agricultural header including a plurality of deck plates, the control system being operatively coupled with the harvester frame and the agricultural header and including at least one sensor coupled with the agricultural header and a controller operatively coupled with the at least one sensor;
detecting, by the at least one sensor, a crop material condition associated with a harvesting operation, the crop material condition being a crop material diameter;
outputting, by the at least one sensor, a crop material condition signal corresponding to the crop material condition;
receiving, by the controller, the crop material condition signal; and
determining, by the controller, an operative parameter of the plurality of deck plates based at least in part on the crop material condition signal and at least one offset condition signal.

12. The method of claim 11, wherein the controller is further configured for:
outputting an adjustment signal, based at least in part on the operative parameter signal, to an actuator configured for selectively moving, based at least in part on the adjustment signal, the plurality of deck plates between a first position and a second position.

13. The method of claim 12, wherein the at least one offset condition signal corresponds to a crop material verticality condition.

14. The method of claim 12, wherein the at least one offset condition signal corresponds to a desired amount of a non-grain crop material.

15. The method of claim 12, wherein the at least one offset condition signal corresponds to a crop material variety.

* * * * *